United States Patent Office 2,812,552
Patented Nov. 12, 1957

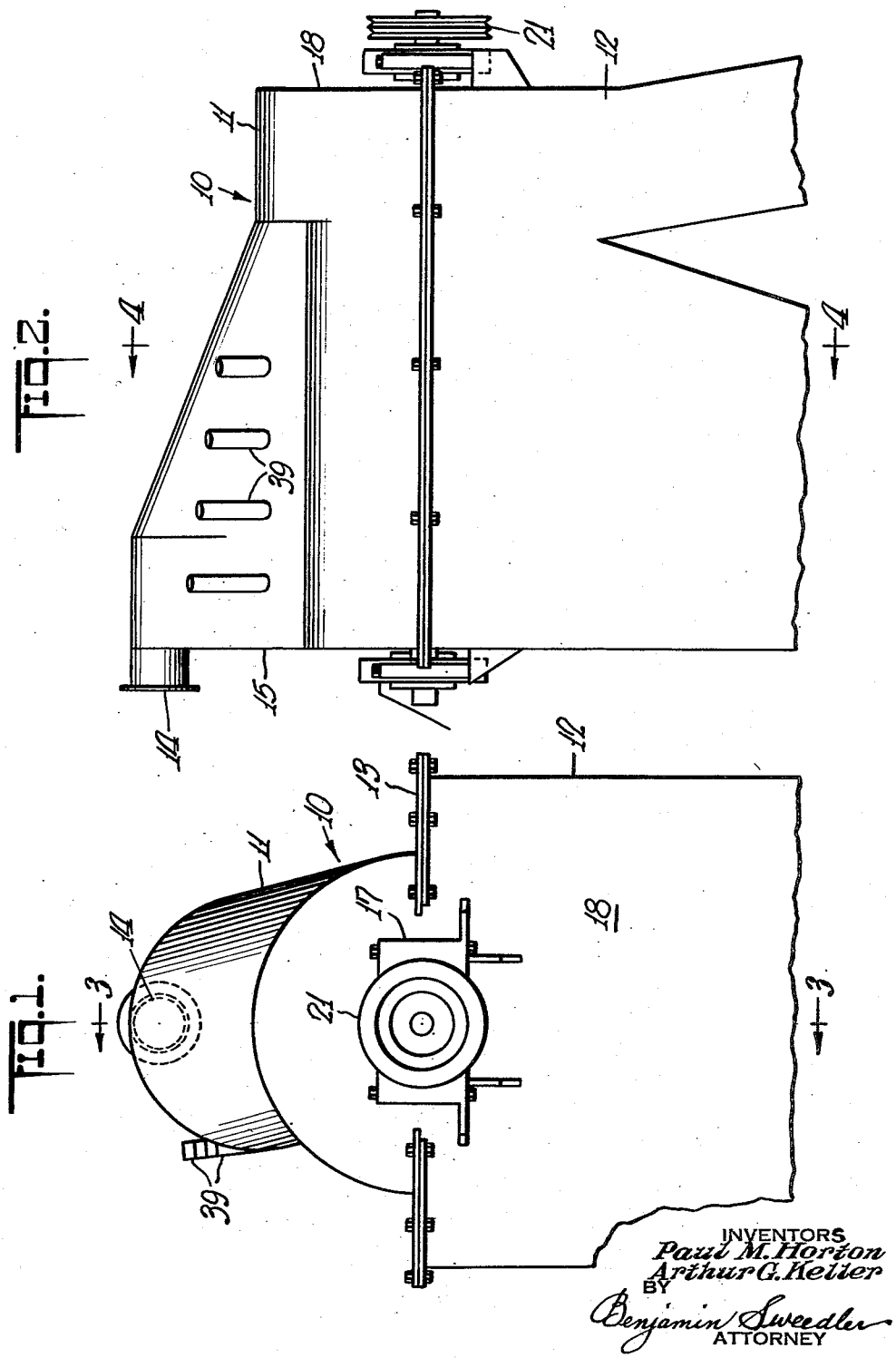

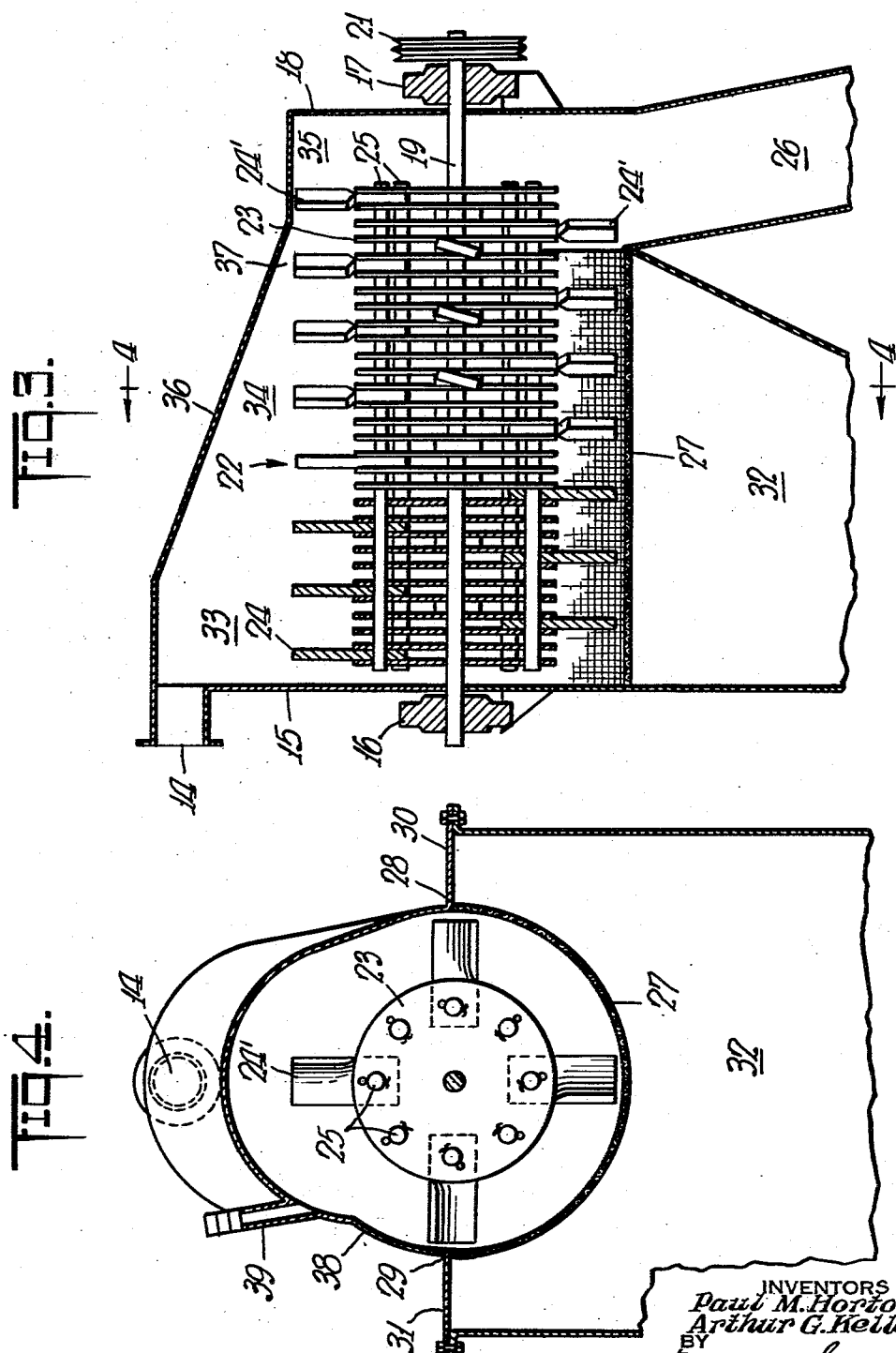

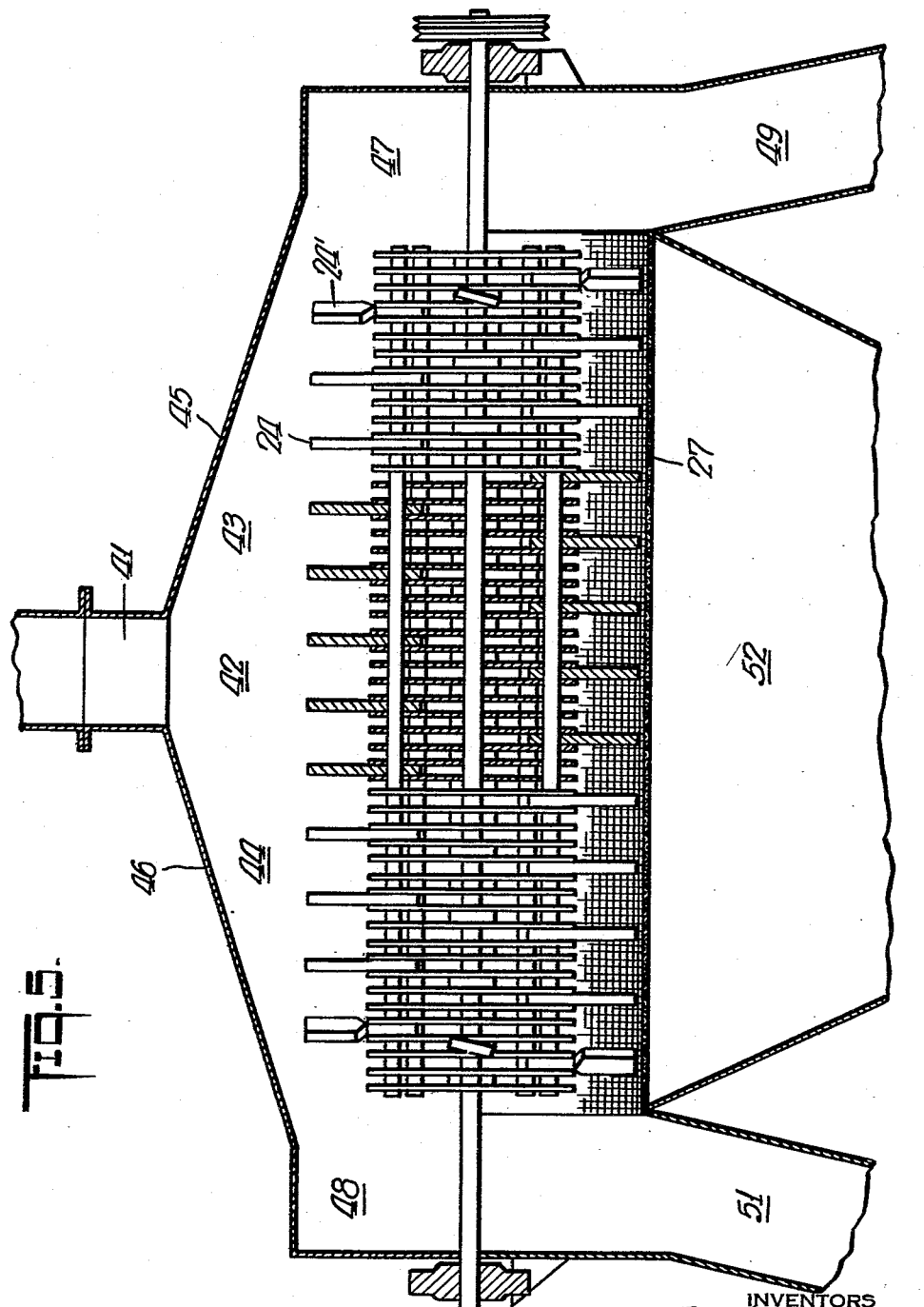

2,812,552

MILL FOR EFFECTING SEPARATION OF PITH AND FIBER FROM STALKY VEGETABLE MATERIALS

Paul M. Horton and Arthur G. Keller, Baton Rouge, La., assignors to Board of Supervisors of Louisiana State University and Agricultural and Mechanical College, Baton Rouge, La.

Application October 12, 1954, Serial No. 461,822

7 Claims. (Cl. 19—90)

This invention relates to mills for processing fibrous vegetable materials containing pith and fiber to separate the pith from the fiber. More particularly, this invention relates to a hammer mill for treating stalky fibrous vegetable materials, to separate them into suitable, pith-free fiber and pith fractions.

The invention of this application is in the nature of an improvement on the invention disclosed and claimed in our copending application Serial No. 103,268, filed July 6, 1949, which issued as Patent No. 2,729,858 on January 10, 1956, and this application is a continuation-in-part of said copending application.

The mills of this invention are designed to treat fibrous vegetable materials, such as sugar cane bagasse, sorgho bagasse, bamboo, reed canes, maize stalks and similar products in which the fibrous constituents are in a resilient condition and are particularly designed to treat fresh bagasse. The fibers of such materials are suitable for the production of pulp for use in paper or alpha-cellulose production or other purposes, but their commercial use in such fields has been handicapped by the presence of varying amounts of pith. The pith fraction, on the other hand, is suitable for use as a filter aid, particularly in the clarification of sugar juice, in animal feeds, agricultural mulches, and as an absorbent in explosive manufacture. However, in order to effect the separation of the fiber from the pith, so that either or both of these fractions of the vegetable fibrous materials may be used for any of the above or other purposes, it is important that the separation be effected economically, i. e., at low cost, because otherwise neither the fiber nor the pith can compete with other available raw materials for these uses.

The separation of the fibers and pith by methods or equipment employed prior to the invention of our aforesaid copending application is too costly to be practical.

By "fresh bagasse" is meant the bagasse as produced and as it first emerges from the conventional milling operation employed in the production of sugar from sugar cane. Fresh bagasse normally contains about 50 percent by weight of moisture, and between 4 and 6 percent of soluble solids, the major portion of which are sugars. The bagasse is usually heavily infected with a wide variety of microflora which attack the soluble materials present, including the sugars, with consequent fermentation and other reactions which evolve considerable heat when the bagasse is stored in large piles. This heat is sufficient to drive off a considerable amount of the moisture present in the bagasse and also to raise the temperature of the stored material to about 60° C. At such temperatures the material is effectively sterilized and dried, while at the same time, because of the acid products produced by the micro-organisms, it is subjected to a mild form of acid cook. The bagasse which has been stored and/or aged in piles is thus quite a different material from the freshly produced bagasse. Thus for example, because of the acid decomposition products resulting from fermentation and other reactions caused by the micro-organisms, some of the pith in the stored or aged bagasse is partially destroyed or changed in nature. Furthermore, the fibrous material in the aged bagasse is less resilient than is the fibrous fraction of fresh bagasse. While the invention herein will be described hereinafter chiefly in connection with the processing of fresh bagasse, it will be understood the invention is not limited thereto.

It is among the objects of the present invention to provide a hammer mill in which the separation of the pith and fiber can be accomplished simply, continuously and economically, including low-power requirements for driving the mill and effecting the said separation.

Other objects and advantages of our invention will become apparent in connection with the following description, and a consideration of the showing in the accompanying drawings of two embodiments of our invention. In these drawings, Fig. 1 is an end view of a hammer mill embodying our invention;

Fig. 2 is a side elevation of the mill shown in Fig. 1;

Fig. 3 is a vertical section through the mill, taken in a plane indicated by the line 3—3 of Fig. 1;

Fig. 4 is a vertical section taken in a plane indicated by the lines 4—4 of Figs. 2 and 3; and Fig. 5 is a vertical section through a modified form of hammer mill embodying our invention.

In the embodiment shown in Figs. 1–4 inclusive, 10 indicates a casing consisting of an upper section 11 and a lower section 12, desirably detachably secured together as at 13. However, a casing in which both the lower and upper sections are made integral and not detachably secured may be used if desired.

An inlet 14 is disposed in an end wall 15 near the top thereof, through which inlet the fresh bagasse may be fed to the mill continuously, as for example by a screw conveyor (not shown). Suitably journalled in bearings 16 and 17, disposed contiguous to the end walls 15 and 18 respectively is a rotor shaft 19. This shaft may be driven by a pulley 21 arranged to be connected to a suitable source of power or by any other suitable drive, such for example as an electric motor connected to the shaft 19 through suitable reduction gearing (not shown).

Mounted on the shaft 19 is the rotor 22 constituted, in the embodiment of the invention shown, of a plurality of circular plates 23 spaced apart axially and to which beaters or hammers 24 are secured by bolts 25 which connect the plates together. The hammers project outwardly beyond the periphery of the plates as clearly shown in Figs. 3 and 4 and preferably are arranged in a generally spiral path. In other words, with the shaft 19 at rest, each fourth hammer may extend up vertically, the next successive hammers of each series of four extends horizontally in one direction, the next successive hammer of each series of four extends downwardly and the last hammer of each series extends horizontally in the opposite direction. A suitable number of hammers, for instance, the last four or eight nearest the end wall 18, may have their outer ends twisted somewhat toward a helical position in respect to the axis of the shaft 19, so as to act as pushers to advance the material towards the fiber discharge chute 26 in the diagonally opposite portion of the casing from that containing inlet 14. The twisted hammers are indicated by the reference numeral 24'.

The beaters or hammers 24 may be tightly secured to plates 23 so that they extend outwardly in a radial direction. Alternatively they may be loosely mounted on the bolts 25, so that the latter act as pivotal supports, and the hammers may swing on the bolts and assume radial positions due to centrifugal force.

In the embodiment of the invention shown in Fig. 3, the hammers 24 are disposed to extend over a portion of the fiber discharge chute 26, so as to aid in effecting the discharge of the fibrous material from the mill. If desired, however, and as shown in the modification of Fig. 5 hereinafter described, the hammers and the rotor carrying the same may be so positioned that no portion of the rotor, including the hammers carried thereby, is positioned above the discharge chute 26, the length of the rotor being co-extensive with that of the semi-cylindrical screen 27 disposed directly beneath the rotor and through which the pith is discharged.

Screen 27 may be suitably supported in the mill, for example, at its opposite ends and desirably has a thickness of from 1/8" to 1/4" or more. It is provided with perforations of a size to permit the pith to pass therethrough and retain the fiber. This screen should be sufficiently durable and sturdy to withstand the action of the hammers on the bagasse passing over the screen, without deformation or damage to the screen. A perforated steel semi-cylindrical screen having a thickness of at least 1/8", desirably about 3/8", has been found satisfactory for use in separating fresh bagasse into pith and fiber fractions. Screen 27, as best shown in Fig. 4, completely encircles the lower half of the rotor 22 and has its terminal ends 28 and 29 abutting the ends of the flanges 30 and 31 respectively, on the upper section 11 of the casing 10. A pith discharge chute 32 communicates with the underside of the screen. This discharge chute, as best shown in Fig. 3, has its upper portion coextensive in length with the length of the screen 27.

In accordance with this invention, the upper section 11 is shaped to provide three distinct zones 33, 34 and 35 along the length of the mill. Zone 33, at the inlet end of the mill, desirably is of a length (the dimension along the axis of shaft 19) equal to 20 to 35 percent of the length of the rotor and of a height to provide a free space above the tips of the hammers equal to from 35 to 45 percent of the rotor diameter (the diameter of a circle defined by the tips of the hammers when rotating). The cross-sectional area of this free space preferably is from 50 to 75 percent of the cross-sectional area of the hammer circle, i. e., the circle defined by the tips of the hammers when they rotate. Zone 33 thus provides the necessary space in which the fresh baggasse may rotate above the tips of the hammers while being beaten by the hammers as the rotor rotates. In other words, rotation of the rotor effects a beating of the incoming fresh bagasse, causing a mass of its to rotate in zone 33 above the hammers. While thus rotating the mass is continuously beaten by the hammers and continuously moved longitudinally along the length of the rotor as the bagasse is continuously fed to the mill through the inlet 14, some of the bagasse, probably a minor portion, being removed from the rotating mass, forced over the screen 27 and returned to the rotating mass. This action effects a loosening of the fibers, without, however, materially reducing the length of the fibers, in the bagasse, and a separation of some of the pith which drops down onto and through screen 27 from which it is discharged.

Zone 34, which communicates with zone 33, is defined by the inclined top wall 36 of the casing 10, which wall is at an angle of 15° to 30° to the horizontal. Thus zone 34 is of gradually diminishing depth from the inlet end of the mill towards the discharge end. The right hand or discharge end of zone 34 (viewing Fig. 3) is of a depth to provide a small clearance 37 above the tip of the hammers, sufficient to permit free rotation of the hammers and to avoid clogging of the mill but small enough to insure that all of the bagasse is caused to pass over the screen 27. Hence, as the bagasse moves continuously longitudinally through the mill it is forced more and more into the hammer circle. Accordingly all of the material fed to the mill is effectively beaten by the hammers 24 before it reaches the discharge zone 35 communicating with zone 34, thus effecting substantially complete removal of the pith from the fiber.

As indicated, zone 35 is the discharge zone through which the fiber, after having passed over the screen 27 and having had the pith removed therefrom, is discharged into and through fiber discharge chute 26 communicating with zone 35.

Disposed in side wall 38 of upper section 11 of the mill in zones 33 and 34 are a series of spaced spray-jets or liquid inlets 39. While four such inlets are shown, it will be understood any desired number may be used and these inlets may be positioned on the opposite side walls. Water is sprayed through these inlets in a downward direction, wetting the bagasse being processed and facilitating the separation of the pith from the fiber, i. e., the water has a tendency to wash the pith out of fiber masses and clean the screen 27. The water-pith mixture drains through screen 27 and flows into and through the pith discharge chute 32. While the use of these sprays is preferred, they are not essential, as satisfactory separation of the pith and fiber may be obtained running the mill dry.

The operation of the mill should be clear from the above description thereof. It is noted that the action of the mill is to hackle and hammer the bagasse, rather than to rub or grind it, this action functioning to loosen and free the fibers from each other, rather than to break them up, and after loosening effected in zone 33 to carry the loosened fibers around and over the screen 27 to permit maximum opportunity for the pith to separate from the fibers and be removed therefrom by passage through screen 27 which retains the fibers. This action of freeing the pith from the fibers is facilitated by the sprays of water supplied to the mill through the jets or inlets 39.

In the modification of Fig. 5, in which like parts have been given like reference numerals, the casing or housing of the mill is provided with a top central inlet 41 through which the bagasse is fed continuously to the mill by any suitable feeding equipment such as a screw conveyor, etc. Disposed directly beneath inlet 41 is the central zone 42 which in general corresponds in dimensions and functions to zone 33 of the modification of Figs. 1–4 inclusive. In zone 42 a mass of the incoming bagasse rotates in the free space above the tips of the hammers, which free space is of a depth or height desirably equal to from 35–45 percent of the rotor diameter while being hackled by the rotating hammers. Leading from opposite sides of the free space 42 are the zones 43 and 44 respectively of gradually diminishing depth, and which correspond in general, in structure and function to free space 34 of the modification of Figs. 1–4 inclusive. The free spaces 43 and 44 are defined by the inclined top walls 45 and 46 respectively, of the housing, which walls may be at an angle of from 15°–30° to the horizontal. Zones 43 and 44 communicate respectively with discharge zones 47 and 48 from which lead the fiber discharge chutes 49 and 51 respectively. A pith discharge chute 52 communicates with the underside of screen 27.

The side walls of the casing, defining zones 43 and 44 of the mill of Fig. 5, may be provided with jets or liquid inlets corresponding to inlets 39.

In the operation of the apparatus of Fig. 5, fresh bagasse is supplied continuously to the mill through inlet 41, accumulates and forms a rotating mass above the tips of the hammers, which mass is beaten by the hammers 24 as they rotate. The action of the hammers and the continuous supply of bagasse to the inlet 41 causes the bagasse to move from zone 42 in opposite direction into and through zones 43 and 44, where the beating action is continued and the loosened bagasse caused to move over the screen 27 while being beaten by the hammers. To facilitate such movement, if desired, one or more series of the hammers in zone 42 may be twisted, with some of the hammers twisted in a direction to cause the material to move through zone 43 and others in a direction to cause the material to move through zone 44. All of the material thus supplied to the mill is hackled and beaten to effectively separate the pith from the fiber, the pith flowing continuously through the openings in screen 27 and being discharged from the mill through pith discharge chute 52, and the pith-free fiber flowing continuously through the fiber discharge chutes 49 and 51 at opposite ends of the mill.

The mills hereinabove described are inexpensive to manufacture and operate, the power consumption is unusually low and substantially complete separation of the pith from the fiber is effected.

Since certain changes may be made in the mills hereinabove described, and different embodiments of the invention could be made without departing from the scope thereof, it is intended that all matter contained in the above description, or shown in the accompanying drawings, shall be interpreted as illustrative and not in a limiting sense.

What is claimed is:

1. Hammer mill apparatus for processing crushed fibrous stalks containing pith to separate the pith and the fibers, said apparatus including a longitudinally extending casing having an inlet in the upper part thereof for said crushed stalks, a rotating shaft in said casing, extending lengthwise thereof, hammers carried by said shaft for breaking up said crushed stalks and liberating the pith therein, a substantially semi-cylindrical screen below said shaft and substantially concentric therewith, a pith discharge chute directly beneath said screen, through which the pith liberated from said fibrous stalks is discharged, the upper part of said casing at the inlet portion thereof being shaped to provide a relatively large free space directly above some of said hammers and extending in the same longitudinal direction as the direction of feed of the crushed stalks through said casing, in which large free space a mass of the crushed stalks fed to the machine may be rotated while subjected to repeated beating by said hammers, said large free space merging into a free space disposed above other of said rotating hammers, which second mentioned free space is of gradually diminishing depth, so that the crushed stalks passing therethrough are forced into contact with the rotating hammers and are carried thereby over said screen to effect removal of the pith from the fibers, the portions of said casing defining said free spaces having imperforate side walls which merge into the side walls of said semi-cylindrical screen forming substantially smooth and continuous surfaces free of projections on the opposite sides of said rotating hammers, and a discharge passageway for the fibers at the terminal end of said second mentioned free space leading from the base of said casing.

2. Hammer mill apparatus as defined in claim 1, in which the said first-mentioned free space is from 35 to 45 percent of the diameter of the circle defining the path through which said hammers rotate, the top of the second-mentioned free space is inclined at an angle of from 15°–30° to the longitudinal axis of said rotating shaft carrying said hammers and the cross-sectional area of the first mentioned free space is within the range of 50–75 percent of the cross-sectional area of the beater circle.

3. Hammer mill apparatus as defined in claim 1, in which a side of the casing defining the first- and second-mentioned free spaces is provided with spaced inlets for supplying liquid.

4. Hammer mill apparatus for processing crushed fibrous stalks containing pith to separate the pith and the fibers, said apparatus including a casing having an inlet in the upper part thereof for said crushed stalks, a shaft in said casing, extending lengthwise thereof, hammers carried by said shaft for breaking up said crushed stalks and liberating the pith therein, a substantially semi-cylindrical screen below said shaft and substantially concentric therewith, a pith discharge chute directly beneath said screen, through which the pith liberated from said crushed stalks is discharged, the upper part of said casing being shaped to provide, in the order mentioned starting with the inlet and thereof, (1) a relatively large free space directly above some of said hammers and extending in the same longitudinal direction as the direction of feed of the crushed stalks through said casing, in which large free space the crushed stalks fed to the machine may be rotated while subjected to repeated beating by said hammers, (2) a free space of gradually diminishing depth, communicating with the first-mentioned free space, disposed above other of said hammers and shaped to cause the crushed stalks passing therethrough to move down into contact with the rotating hammers and to be carried thereby over said screen to effect removal of the pith from the fibers, and (3) a fiber discharge zone communicating with said second-mentioned free space, the portions of said casing defining said free spaces having imperforate side walls which merge into the side walls of said semi-cylindrical screen forming substantially smooth and continuous surfaces free of projections on the opposite sides of said rotating hammers, and a fiber discharge chute communicating with the base of said discharge zone.

5. Hammer mill apparatus for processing crushed fibrous stalks containing pith to separate the pith and the fibers, said apparatus including a longitudinally extending casing having near the top of one end wall an inlet for said crushed stalks, a horizontally extending shaft in said casing, extending lengthwise thereof, hammers carried by said shaft for breaking up said material and liberating the pith therein, a substantially semi-cylindrical screen below said shaft and substantially concentric therewith, said screen being of a length less than that of the length of said casing and extending from one end of said casing short of the other end, a pith discharge chute directly beneath said screen through which pith liberated from said fibrous stalks is discharged, a chute for the discharge of fibrous material disposed at the base of the casing, contiguous to one end of said screen, the upper part of said casing at the inlet end thereof being shaped to provide a relatively large free space directly above some of said hammers, and extending in the same longitudinal direction as the direction of feed of the stalks through said casing, in which large free space the crushed stalks fed to the machine may be rotated while subjected to repeated beating by said hammers, said large free space merging into a free space disposed above other of said rotating hammers, which second-mentioned free space is of gradually diminishing depth so that the crushed stalks passed therethrough are forced into contact with the rotating hammers and are carried thereby over said screen to effect removal of the pith from the fiber, the portions of said casing defining said free spaces having imperforate side walls which merge into the side walls of said semi-cylindrical screen forming substantially smooth and continuous surfaces free of projections on the opposite sides of said rotating hammers.

6. A hammer mill comprising a longitudinally extending casing, a semi-cylindrical screen disposed in said casing, spaced from the opposite ends of said casing, discharge chutes leading from the base of the said casing beyond the ends of said screen for the discharge of fibrous material substantially free of pith, a pith discharge chute directly beneath said screen, a longitudinally extending rotatable shaft having a rotor thereon equipped with hammers, which rotor is of a length to extend over the screen, said casing having a substantially centrally located top inlet for supplying the fibrous stalks to the casing and being shaped to provide a free space of substantial depth disposed directly above the tips of some of said hammers, in which space a mass of stalks fed to the machine through said inlet may be rotated while being beaten by said hammers, said casing being also shaped to provide zones of gradually diminishing depth extending from said free space towards the ends of said casing and communicating with said discharge chutes, through which zones crushed stalks fed to the machine are moved in opposite directions away from each other so that they are gradually brought into contact with other of said rotating hammers, and carried thereby over said screens to effect removal of the pith from the fiber, the fiber thus separated from the pith being discharged through said fiber discharge chutes and the pith through said pith discharge chute.

7. A hammer mill comprising a longitudinally extending casing, a top centrally disposed feed inlet to said casing, a semi-cylindrical screen disposed in said casing, spaced from the opposite ends of said casing, discharge chutes leading from the base of the said casing beyond the ends of said screen for the discharge of fibrous material, substantially free of pith, a discharge chute directly beneath said screen for the discharge of pith, a longitudinally extending rotatable shaft having a rotor thereon equipped with hammers, which rotor is of a length to extend over the screen, the top of said casing being shaped to provide, (1) a free space of substantial depth disposed directly above the tips of some of said hammers and communicating with said inlet, in which free space a mass of stalks fed to the machine may be rotated while being beaten by said hammers, (2) zones of gradually diminishing depth extending from said free space towards the ends of said casing, through which zones crushed stalks fed to the machine are moved in opposite directions away from each other so that they are gradually brought into contact with other of said rotating hammers, and carried thereby over said screens to effect removal of the pith from the fiber, and (3) fiber discharge zones communicating with said zones of gradually diminishing depth.

References Cited in the file of this patent

UNITED STATES PATENTS

| | | |
|---|---|---|
| 28,361 | Gilmore | May 22, 1860 |
| 148,997 | Taylor | Mar. 24, 1874 |
| 911,335 | Sargent | Feb. 2, 1909 |
| 978,237 | Treese | Dec. 13, 1910 |
| 1,990,992 | Lang et al. | Feb. 12, 1935 |